US009619309B2

(12) United States Patent
Abellanas et al.

(10) Patent No.: US 9,619,309 B2
(45) Date of Patent: Apr. 11, 2017

(54) ENFORCING DIFFERENT OPERATIONAL CONFIGURATIONS FOR DIFFERENT TASKS FOR FAILURE RATE BASED CONTROL OF PROCESSORS

(71) Applicant: Intel Corporation, Santa Clara, CA (US)

(72) Inventors: Enric H. Abellanas, Cardedeu (ES); Xavier Vera, Barcelona (ES); Nicholas Axelos, Barcelona (ES); Javier C. Casado, Barcelona (ES); Tanausu Ramirez, Barcelona (ES); Daniel Sanchez Pedreño, Murcia (ES)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 13/730,822

(22) Filed: Dec. 28, 2012

(65) Prior Publication Data

US 2014/0189696 A1    Jul. 3, 2014

(51) Int. Cl.
*G06F 9/46*    (2006.01)
*G06F 11/00*   (2006.01)
*G06F 11/07*   (2006.01)
*G06F 1/26*    (2006.01)

(52) U.S. Cl.
CPC .............. *G06F 11/008* (2013.01); *G06F 1/26* (2013.01); *G06F 11/0703* (2013.01); *G06F 11/07* (2013.01); *G06F 11/0724* (2013.01)

(58) Field of Classification Search
CPC .... G06F 11/008; G06F 11/0703; G06F 11/07; G06F 11/0724

USPC .......... 714/738, 718, E11.023, 30; 257/355, 257/360; 718/102, 104; 326/9, 10
See application file for complete search history.

(56) References Cited

U.S. PATENT DOCUMENTS

| | | | |
|---|---|---|---|
| 7,454,316 B2 * | 11/2008 | Bose et al. ..................... | 702/186 |
| 7,457,725 B1 * | 11/2008 | Civilini ........................ | 702/183 |
| 7,734,980 B2 | 6/2010 | Alexander et al. | |
| 7,765,412 B1 * | 7/2010 | Burr ........................ | G06F 1/206 324/750.3 |
| 7,849,387 B2 | 12/2010 | Biswas et al. | |
| 8,074,110 B2 | 12/2011 | Vera et al. | |
| 8,151,094 B2 | 4/2012 | Vera et al. | |
| 8,656,216 B2 * | 2/2014 | Shigehara ..................... | 714/10 |

(Continued)

OTHER PUBLICATIONS

Hazucha, et al., "Impact of CMOS Technology Scaling on the Atmospheric Neutron Soft Error Rate", Nuclear Science, IEEE Transactions on vol. 47, Issue 6, Dec. 2000, pp. 2586 2594.

(Continued)

*Primary Examiner* — Abu Ghaffari
(74) *Attorney, Agent, or Firm* — Vecchia Patent Agent, LLC

(57) ABSTRACT

A method of an aspect includes determining a different operational configuration for each of a plurality of different maximum failure rates. Each of the different maximum failure rates corresponds to a different task of a plurality of tasks. The method also includes enforcing a plurality of logic each executing a different task of the plurality of tasks to operate according to the different corresponding determined operational configuration. Other methods, apparatus, and systems are also disclosed.

23 Claims, 13 Drawing Sheets

(56) References Cited

U.S. PATENT DOCUMENTS

| | | | | |
|---|---|---|---|---|
| 8,667,448 B1* | 3/2014 | Chou | ............... | G06F 17/5081 716/106 |
| 9,058,574 B2* | 6/2015 | Moliere | ............ | G06F 17/5081 |
| 2006/0253715 A1* | 11/2006 | Ghiasi | ............... | G06F 1/3203 713/300 |
| 2007/0050661 A1* | 3/2007 | Ferren | ............... | G06F 11/0721 714/1 |
| 2008/0082285 A1* | 4/2008 | Samaan et al. | ............ | 702/118 |
| 2009/0100437 A1* | 4/2009 | Coskun | ............... | G06F 9/5027 718/105 |
| 2010/0138693 A1* | 6/2010 | Ohkawa | ............... | G06F 11/188 714/25 |
| 2010/0205607 A1* | 8/2010 | Shivanna | ............ | G06F 9/4881 718/103 |
| 2011/0126056 A1* | 5/2011 | Kelleher | ............... | G06F 1/3203 714/42 |
| 2011/0173432 A1* | 7/2011 | Cher | ................ | G06F 17/5045 713/100 |
| 2011/0191602 A1* | 8/2011 | Bearden | ................ | G06F 1/26 713/300 |
| 2011/0239017 A1* | 9/2011 | Zomaya | ............... | G06F 1/3203 713/320 |
| 2011/0314210 A1* | 12/2011 | Zorn | ................ | G06F 11/1048 711/105 |
| 2012/0191384 A1* | 7/2012 | Kalgren | ............... | G01D 3/08 702/58 |
| 2012/0297036 A1* | 11/2012 | Frank | ..................... | H04L 12/12 709/221 |
| 2014/0107822 A1* | 4/2014 | Chadwick et al. | ............ | 700/95 |

OTHER PUBLICATIONS

Mukherjee, et al., "A Systematic Methodology to Compute the Architectural Vulnerability Factors for a High-Performance Microprocessor", Proceedings of the 36th Annual International Symposium on Microarchitecture (MICRO), Dec. 2003, pp. 1-12.

Nguyen, et al., "A Systematic Approach to SER Estimation and Solutions", IEEE International Reliability Physics Symposium Proceedings, 2003. 41st Annual. 2003, pp. 60 70.

Walcott, et al., "Dynamic Prediction of Architectural Vulnerability from Microarchitectural State", ISCA'07, Jun. 9-13, 2007, 12 pages.

* cited by examiner

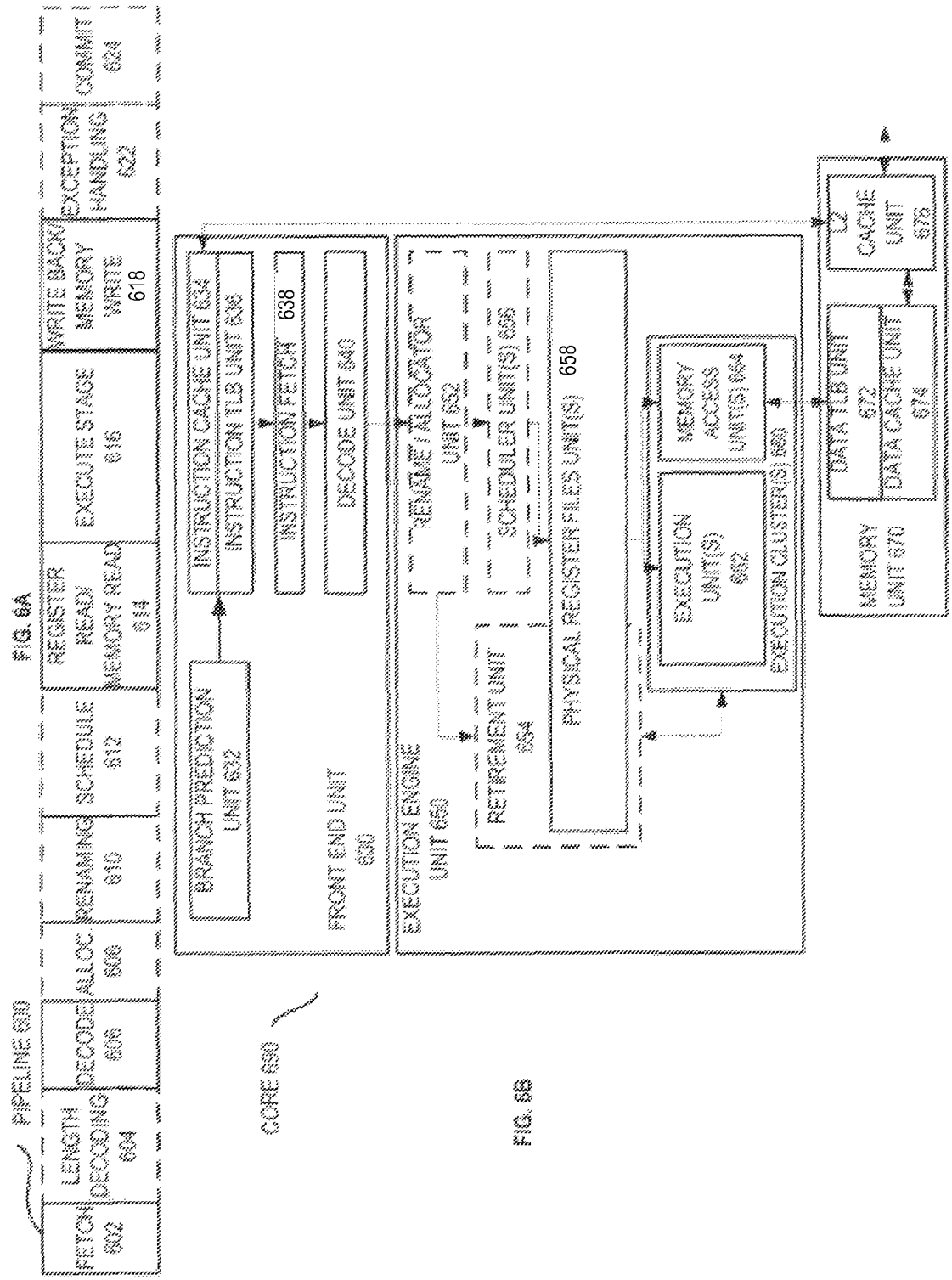

ENFORCING DIFFERENT OPERATIONAL CONFIGURATIONS FOR DIFFERENT TASKS FOR FAILURE RATE BASED CONTROL OF PROCESSORS

BACKGROUND

Field

Embodiments relate to the field of integrated circuits. In particular, embodiments relate to the field of reliability management for integrated circuits.

Background Information

Reliability is an important characteristic for processors and other integrated circuits. However, during operation processors and other integrated circuits are susceptible to failures, which occur gradually over time, and which tend to limit their reliability.

FIG. 1 is a block diagram of an example of a known processor 100. The processor of this example has a first core 102-1 through a seventh core 102-7. Each of the cores is operable to execute at least one task. As shown, a first task 104-1 (e.g., a thread, application, etc.) may execute on the first core and a seventh task 104-07 may execute on the seventh core. Over time, failures 106 may occur in the cores and/or in the processor. Without limitation, the failures may be due to high-energy particles impacting the processor, as well as due to other known causes. At some point, these failures may cause the processor, or at least a portion thereof (e.g., a core), to cease to function properly.

A fixed global failure rate is commonly used as a design parameter for processors and other integrated circuits to help provide a certain level of reliability (e.g., a certain expected device lifetime). The global failure rate may quantify the rate at which failures are predicted or expected to occur in the integrated circuit (e.g., the number of failures per unit time and/or the time between failures). The global failure rate may be expressed in various metrics known in the arts, such as, for example, a failure in time (FIT) rate, a mean time between failures (MTBF), or the like. By way of example, the FIT rate may represent the number of failures that are expected per billion device-hours of operation.

The integrated circuit may initially be designed with an objective of not exceeding the fixed global failure rate. However, one potential drawback with such a fixed global failure rate is that it may tend to limit the amount of logic (e.g., number of cores) that can be included in the design of the integrated circuit. In general, the more logic the integrated circuit has, the greater the actual failure rate. Even if it is desirable (e.g., from a performance perspective) to add an additional core to the design of the integrated circuit, such an additional core may cause the fixed global failure rate to be exceeded, in which case the additional core would generally be omitted from the design. Accordingly, in conventional integrated circuits, the fixed global failure rate, at least in some instances, may tend to limit performance and/or reduce energy efficiency (e.g., it may cause the cores to operate at a higher voltage).

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention.

DETAILED DESCRIPTION

Disclosed herein are embodiments of failure rate management methods, logic, processors, and systems. In the following description, numerous specific details are set forth (e.g., specific processor configurations, failure rate management logic, failure rate estimation equations and parameters, logic partitioning/integration details, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

Figure 1:
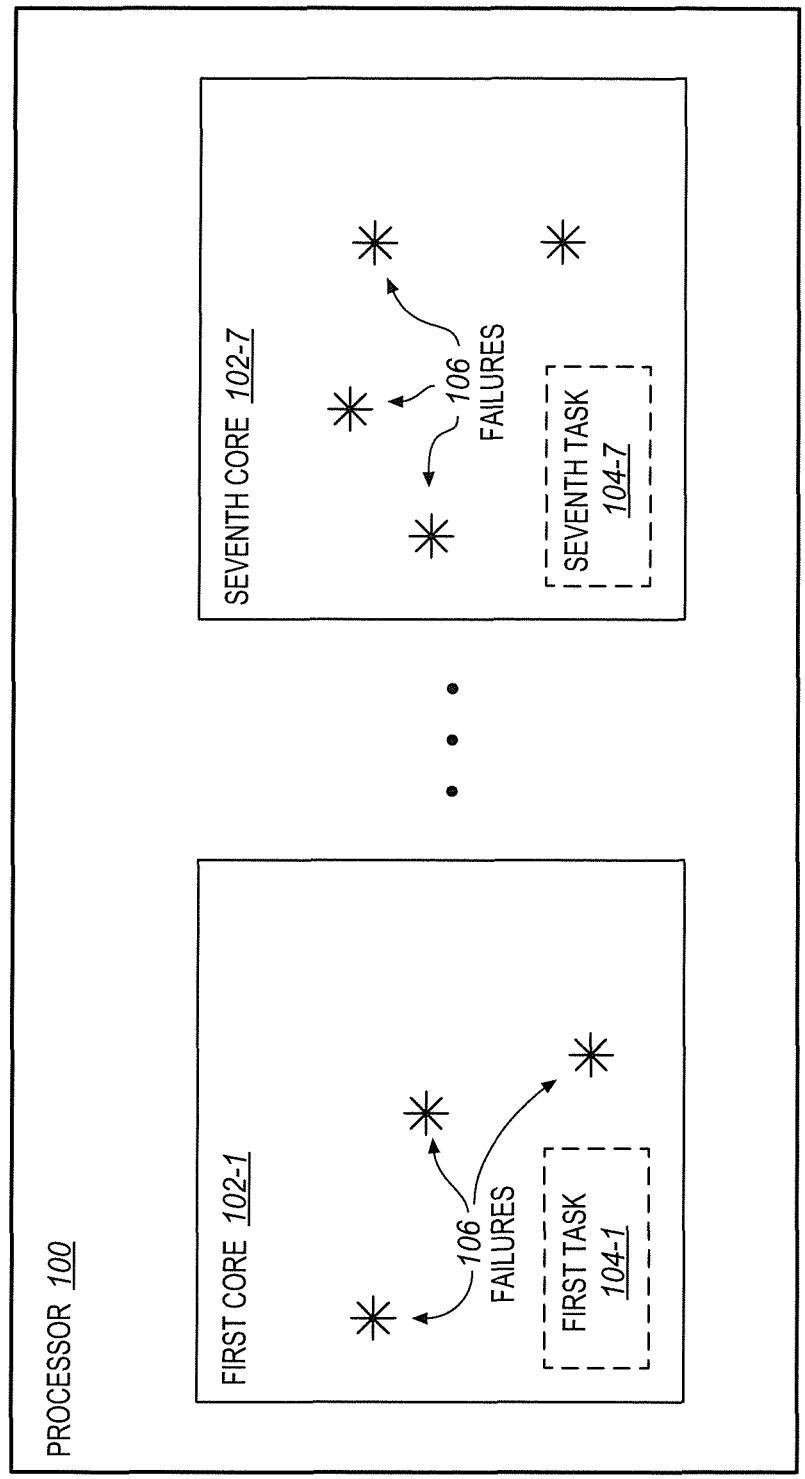
FIG. 1 is a block diagram of an example of a known processor.
Figure 2:
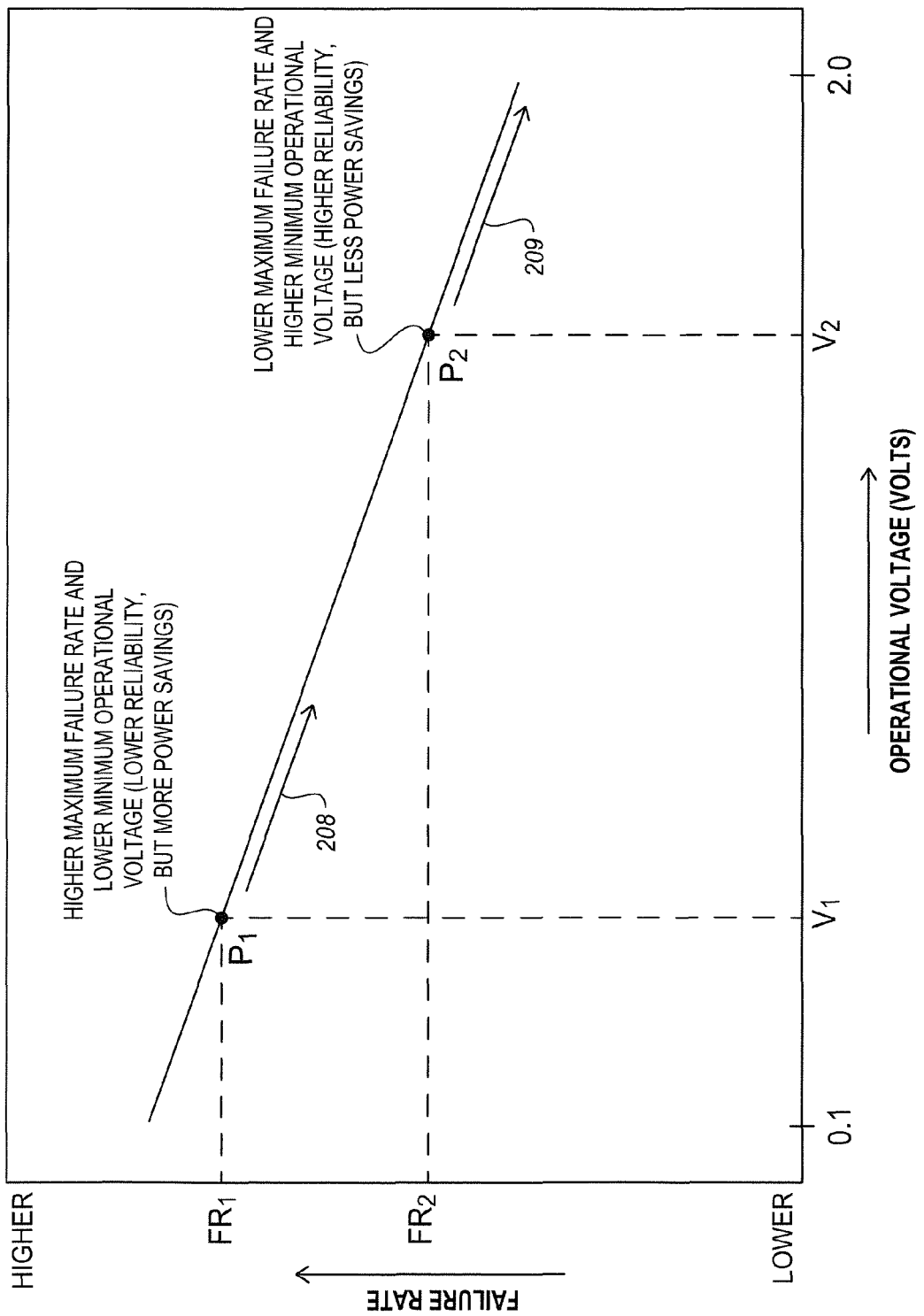
FIG. 2 is a graph illustrating an embodiment of a relationship between the failure rate of an integrated circuit and the operational voltage of the integrated circuit.

FIG. 2 is a graph illustrating an embodiment of a relationship between the failure rate of an integrated circuit and the operational voltage of the integrated circuit. The failure rate is plotted on the vertical axis. By way of example, the failure rate may be expressed as a FIT rate or some other metric. The operational voltage is plotted on the horizontal axis. In the illustration, the operational voltage ranges from 0.1 to 2.0 volts (V), although the scope of the invention is not limited to this range.

As shown, the failure rate decreases as the operational voltage increases. Without wishing to be bound by theory, some experts presently believe that this relationship is due in part to a decrease in the rate at which charged particles impact integrated circuits with increasing operational voltage of the integrated circuits. The failure rate is inversely related to reliability (e.g., as the failure rate decreases the reliability increases). Accordingly, the reliability of the integrated circuit increases with increasing operational voltage.

In some embodiments, voltage may be controlled, based at least in part on such a relationship, in order to provide a desired failure rate. For example, a minimum allowed operational voltage of logic may be controlled, based at least in part on such a relationship, in order to achieve a desired maximum allowed failure rate. For example, a first operational point P1 has a higher maximum failure rate FR1 and a corresponding lower minimum operational voltage V1. The voltage V1 represents the smallest voltage that ensures the maximum failure rate FR1 is not exceeded. If the voltage decreases below V1 the failure rate FR1 will be exceeded, however if the voltage increases above V1 the failure rate will correspondingly decrease along the direction of arrow 208. Similarly, a second operational point P2 has a lower maximum failure rate FR2 and a corresponding higher minimum operational voltage V2. The voltage V2 represents the smallest voltage that ensures the maximum failure rate FR2 is not exceeded. If the voltage decreases below V2 the failure rate FR2 will be exceeded, however if the voltage increases above V2 the failure rate will correspondingly decrease from FR2 along the direction of arrow 209. As used herein, the terms "lower" and "higher" are relative terms (i.e., relative to one another) not absolute terms (e.g., V2 is relatively higher than V1, FR2 is relatively lower than FR1, etc.).

In the illustrated embodiment, a linear relationship has been used to approximate the relationship between failure rate and operational voltage. Such a linear relationship may be appropriate for certain types of logic and/or certain implementations. Alternatively, if desired non-linear relationships may optionally be used (e.g., to provide additional levels of sophistication to the relationship). The scope of the invention is not limited to any particular type of relationship between failure rate and voltage, but rather different types of relationships may be used depending upon the desired degree of sophistication, the particular type of logic, etc. Moreover, as will be described further below, in some embodiments, one or more derating factors may optionally be used to relate voltage and a desired failure rate.

As is well known, voltage also affects the power consumption of an integrated circuit. In particular, the power consumption of an integrated circuit generally increases as the operational voltage of the integrated circuit increases. However, as previously mentioned, increasing the operational voltage of an integrated circuit generally decreases the failure rate of the integrated circuit. Accordingly, maintaining low failure rates and maintaining low power consumption are generally in opposition with one another (e.g., reducing failure rate tends to increase power consumption and/or reducing power consumption tends to increase failure rate).

Some embodiments pertain to failure rate based control of processors and/or their logic (e.g., failure rate based voltage control, failure rate based enabling or disabling of logic, failure rate based reconfiguration of the processor in other ways that affect the failure rate, etc.). In some embodiments, rather than using a single failure rate (or reliability level) for the entire integrated circuit, at least two different maximum allowed failure rates (or minimum allowed reliability levels) may be used for different tasks and/or portions of the integrated circuit used to implement the tasks. For example, a lower maximum allowed failure rate (e.g., FR2) may be used for a core, logical processor, or execution engine used to execute or implement a first task (e.g., a task whose failure would be highly undesirable), whereas a higher maximum allowed failure rate (e.g., FR1) may be used for a core, logical processor, or execution engine used to execute or implement a second task (e.g., a task whose failure would not be quite as undesirable). In some embodiments, in order to implement the different maximum allowed failure rates (or minimum allowed reliability levels), different minimum allowed voltages may be used for the different logic or portions of the integrated circuit. For example, a higher minimum allowed operational voltage (e.g., V2) may be imposed on the core, logical processor, or execution engine executing the first task at the lower maximum failure rate (e.g., FR2), whereas a lower minimum allowed operational voltage (e.g., V1) may be imposed on the core, logical processor, or execution engine executing the second task at the higher maximum failure rate (e.g., FR1). That is, in some embodiments, the minimum allowed operational voltage may be controlled and/or imposed in a way that takes into account different desired maximum allowed failure rates for different tasks and/or portions of the integrated circuit used to implement those tasks. Advantageously, this helps to allow voltage and/or power management objectives to be balanced with task-based reliability objectives.

Figure 3:
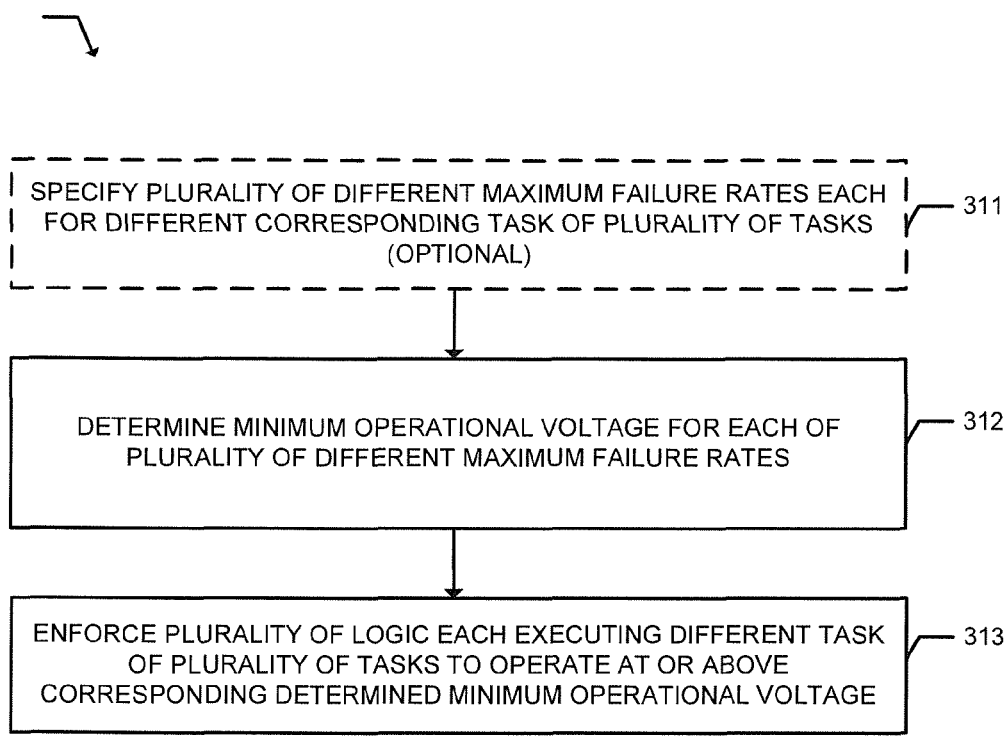
FIG. 3 is a block flow diagram of an embodiment of a method of failure rate based minimum operational voltage determination and control.

FIG. 3 is a block flow diagram of an embodiment of a method 310 of failure rate based voltage control. In some embodiments, the method may be implemented in a processor or other integrated circuit.

The method optionally includes specifying a plurality of different maximum failure rates, each for a different corresponding task of a plurality of tasks, at block 311. Each task may represent a set of operations performed on a given logic. Examples of suitable tasks include, but are not limited to, applications, threads, sub-threads, code regions/phases, and the like, and combinations thereof. In various embodiments, the processor, an operating system, a compiler, a user input/output device controlled by a user, other logic or devices, or a combination thereof, may specify or configure the different maximum failure rates. In various embodiments, the failure rates may be expressed as absolute failure rates (e.g., FIT rates), percentages of a fixed global failure rate (e.g., 10% of a global FIT rate), an abstract failure rate level (e.g., a highest predetermined failure rate level, an intermediate predetermined failure rate level, a lowest predetermined failure rate level, etc.), or in another way appropriate for the particular implementation. In some embodiments, the failure rates may be fixed or predetermined, whereas in other embodiments the failure rates may be flexible or not predetermined. In some embodiments, the failure rates may be stored in a configuration register, memory, or other storage.

The method also includes determining a minimum operational voltage for each of the plurality of the different maximum failure rates, at block 312. In some embodiments, this may include using a relationship between failure rate and voltage (e.g., similar to that shown in FIG. 2). In other embodiments, this determination may optionally be made based also on one or more derating factors. Examples of suitable derating factors include, but are not limited to, temperature, altitude, Architectural Vulnerability Factor (AVF), timing derating factors, logic derating factors, other derating factors that quantify the proportion of logic used to implement a task, and various combinations thereof. For example, in one implementation, in order to find the required minimum voltage, the actual failure rate may be calculated based on the current voltage and the one or more derating factors. Then, a table with the core failure rates for each voltage may be accessed and the minimum that ensures that the desired failure rate is met may be selected. The use of derating factors may help to more accurately determine the appropriate voltages and/or more accurately ensure that the desired failure rates are achieved, although this is not required.

In one illustrative example, an architectural vulnerability factor (AVF) of a hardware logic may be used as a derating factor. The hardware logic may be a whole core, a storage region, or other hardware with a relatively large impact on the overall failure rate. In order to calculate the AVF of the most significant hardware, performance counters may optionally be used, as is known in the arts. One example equation that may be used to estimate the actual FIT rate is as follows:

$$FIT_{Actual} = FIT_{Core-HR}(\text{Current Voltage}) + AVF_{HR} * RER_{HR}(\text{Current Voltage})$$

In this equation, $RER_{HR}$ is the raw error rate of the hardware at the current voltage, $AVF_{HR}$ is the architectural vulnerability factor of this hardware, and $FIT_{Core-HR}$ is the failure in time of the rest of the core at the current voltage and considering the worst case AVF. For example, with the derating factor:

$$FIT_{Actual} = FIT_{Core-HR}(\text{Current Voltage}) + AVF_{HR} * RER_{HR}(\text{Current Voltage})$$

There may be a table with $FIT_{Core-HR}$ for all voltages and a second with $RER_{HR}$ for all voltages. The logic may calculate $FIT_{Actual}$ with increasing voltages until $FIT_{Actual} < FIT_{Desired}$. Without the derating factor:

$$FIT_{Actual} = FIT_{Core}(\text{Current Voltage})$$

There may be a table with $FIT_{Core}$ for all voltages. The logic may calculate $FIT_{Actual}$ with increasing voltages until $FIT_{Actual} < FIT_{Required}$.

In some embodiments, a higher minimum operational voltage may be determined for a corresponding lower maximum failure rate assigned to a first task (e.g., whose failure is highly undesirable), whereas a lower minimum operational voltage may be determined for a corresponding higher maximum failure rate assigned to a second task (e.g., whose failure is not as undesirable). In some embodiments, the first task (e.g., whose failure is highly undesirable) may be a first task having supervisory control over a second task (e.g., whose failure is not as undesirable). For example, the first task may be an operating system task and the second task may be a non-operating system task (e.g., a video decoding task, a graphics processing task, or another type of application task). As another example, the first task may be a main thread and the second task may be a sub-thread of the main thread (e.g., a child thread of a parent thread). In some embodiments, the first task (e.g., whose failure is highly undesirable) may be a real-time and/or time-critical task (e.g., a cell phone voice handling task) and the second task (e.g., whose failure is not as undesirable) may be a non-real time and/or non-time-critical task. In other embodiments, the first task (e.g., whose failure is highly undesirable) may be a bank database task or other similar commercial task that needs to have higher reliability and the second task (e.g., whose failure is not as undesirable) may be a task associated with other types of applications that are not as critical to have such high reliability.

Moreover, in some embodiments, there may be at least three different maximum allowed failure rates and at least three different corresponding minimum allowed voltages. For example, a relatively lowest failure rate may be used for an operating system task, an intermediate failure rate may be used for a main thread of an application, and a relatively highest failure rate may be used for a sub-thread of the main thread. These are just a few illustrative examples. Those skilled in the art, and having the benefit of the present disclosure, will appreciate that still other examples are contemplated.

A derating factor may represent a factor that alters the failure rate of a system. Often the failure rate may be substantially fixed and may be based on the area of the logic circuit (A), the critical charge of the logic circuit, and the neutron flux (e.g., expected particle strikes per unit time). For example, the FIT may be expressed as:

$$FIT = K * Flux * A * \exp(-Qcrit/Qs)$$

However, many factors may alter (e.g., often reduce) the failure rate estimation. These factors are referred to as derating factors. For example, there may be a timing derating factor (e.g., only specific fractions of every cycle are susceptible to errors so that if a particle strike occurs during the non-susceptible time the system is not going to be affected), an altitude derating factor (e.g., the neutron flux changes depending on the altitude), an AVF derating factor (e.g., if we are not using a structure it may not be included in the estimate as being susceptible since). The derating factors may take into account the fact that, although there may be a constant flux of particle strikes, the susceptible periods of time and/or the susceptible areas of the chip may change over time. If these derating factors are taken into account then the actual FIT may be estimated lower and more accurately which may allow operation in less restricted conditions (e.g., lower voltage, less restriction on error correction, less restriction on other operating conditions, less protection, etc.)

Referring again to FIG. 3, the method also includes enforcing a plurality of logic (e.g., cores, logical processors, or execution engines) each executing or implementing a different task of the plurality of tasks to operate at or above the corresponding determined minimum operational voltage, at block 313. In some embodiments, voltages may optionally be increased above the minimum operational voltage, such as in conjunction with dynamic voltage scaling, dynamic frequency and voltage scaling, or the like. This may be done in substantially conventional ways except for the minimum operational voltage limits being imposed in order to maintain the desired failure rates.

Advantageously, in the method 310, rather than using a single failure rate (or reliability level), at least two different maximum allowed failure rates (or minimum allowed reliability levels) may be used for different tasks and/or portions of the integrated circuit used to implement those tasks. In order to implement the different maximum allowed failure rates, different minimum allowed voltages may be used for the different tasks and/or portions of the integrated circuit used to implement those tasks. This may help to allow power and/or voltage to be managed or controlled in a way that takes into account the different maximum allowed failure rates desired for different tasks and/or portions of the integrated circuit used to implement those tasks. That is, voltage and/or power management objectives may be balanced with and/or implemented consistent with task-based reliability objectives. In some embodiments, the method 310 may be repeated during operation. For example, the method may be repeated based on task changes, based on task switching, periodically at set intervals, etc.

Figure 4:
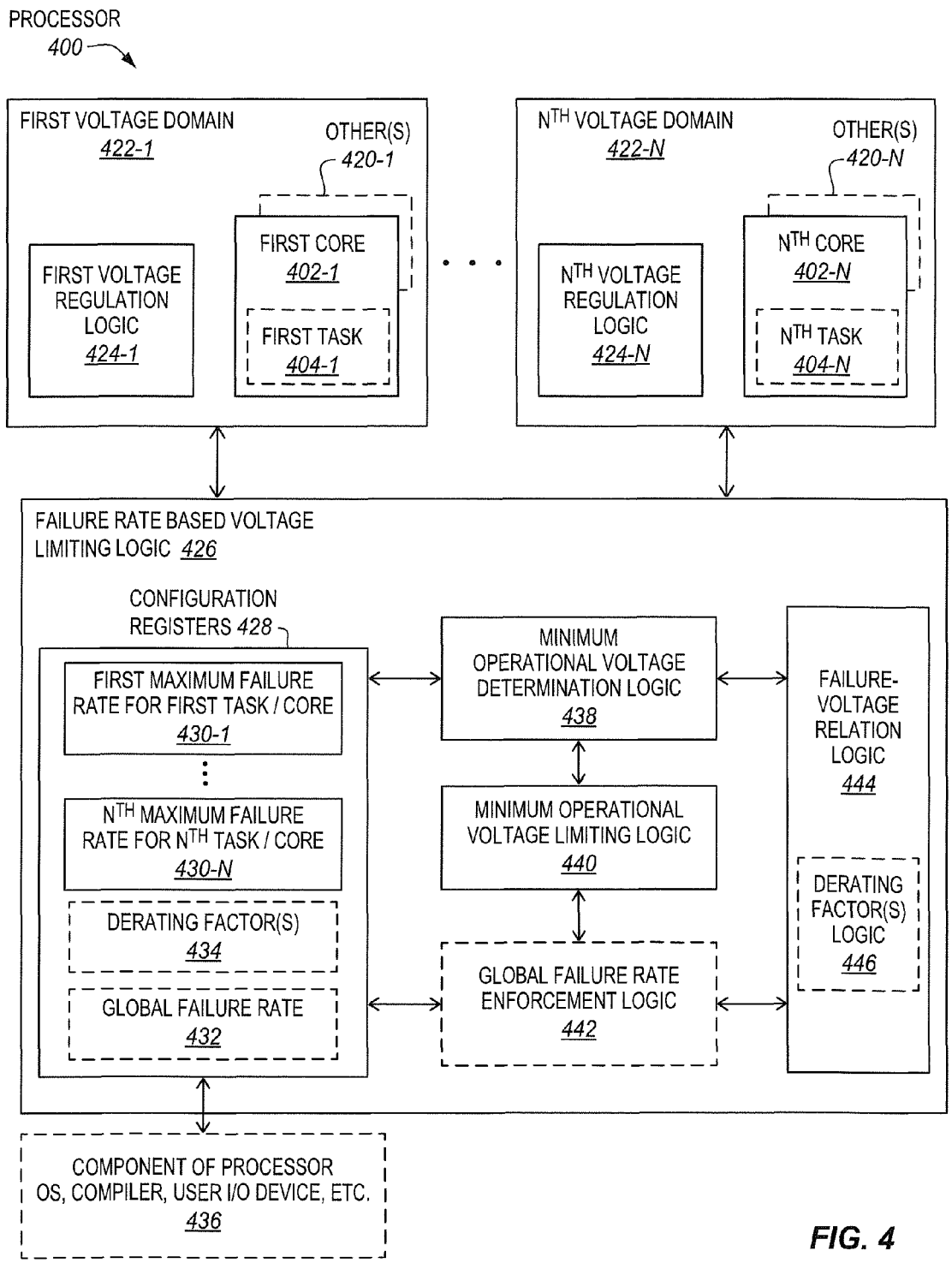
FIG. 4 is a block diagram of an embodiment of a processor having failure rate based minimum operational voltage limiting logic.

FIG. 4 is a block diagram of an embodiment of a processor 400 having failure rate based minimum voltage limiting logic 426. In some embodiments, the processor 400 may perform one or more operations and/or the method of FIG. 3. Alternatively, the processor 400 may perform similar or entirely different operations and/or methods. Moreover, the operations and/or method of FIG. 3 may be performed by a similar or entirely different processor or other integrated circuit.

In some embodiments, the processor 400 may be a general-purpose processor (e.g., of the type used in desktop, laptop, server, and like computers). Alternatively, the processor may be a special-purpose processor. Examples of suitable special-purpose processors include, but are not limited to, network processors, communications processors, cryptographic processors, graphics processors, co-processors, embedded processors, and digital signal processors (DSPs), to name just a few examples.

The processor includes a first core 402-1 through an Nth core 402-N. The number N typically ranges from two to hundreds, often from two to on the order of tens. In some embodiments, the number of N of cores may be at least 5, 10, 20, 50, or even more, although this is not required. Often, the benefits provided by embodiments may increase with increasing numbers of cores. The cores may be homogeneous type of cores (e.g., having the same ISA, same size, etc.) or heterogeneous cores (e.g., having different ISA, different sizes, etc.) The first core is operable to execute a first task 404-1 and the Nth core is operable to execute an Nth task 404-N. The first core is in a first voltage domain 422-1 and the Nth core is in an Nth voltage domain 422-N. Optionally one or more other cores 420-1 may be included in the first voltage domain and/or one or more other cores 420-N may be included in the Nth voltage domain. The first voltage domain includes first voltage regulation logic 424-1. The first voltage regulation logic is operable to regulate the voltage of the first voltage domain 422-1, the first core 402-1, and/or the first task 404-1. The Nth voltage domain includes Nth voltage regulation logic 424-N. The Nth voltage regulation logic is operable to regulate the voltage of the Nth voltage domain 422-N, the Nth core 402-N, and/or the Nth task 404-N.

The failure rate based minimum voltage limiting logic 426 broadly represents an embodiment of reliability management logic that manages reliability through the minimum operational voltage. In other embodiments, reliability management logic may manage reliability through other factors (e.g., by disabling error correction code logic or other optional logic, or by otherwise reconfiguring the processor in a way that changes the actual failure rate) instead of and/or in addition to changing the minimum operational voltage. The logic 426 is coupled with the first voltage domain 422-1 and/or the first voltage regulation logic 424-1 and is coupled with the Nth voltage domain 422-N and/or the Nth voltage regulation logic 424-N. In some embodiments, the failure rate based minimum voltage limiting logic may be operable to dynamically change the minimum allowed operational voltages at which logic is allowed to operate based on different prescribed allowed failure rates and/or reliability levels of the tasks and/or the logic used to execute those tasks, a voltage-failure rate relation, and optionally one or more derating factors.

The illustrated embodiment of the failure rate based minimum voltage limiting logic 426 includes one or more configuration registers 428. The configuration register(s) are operable to store a first maximum allowed failure rate 430-1 to be used for the first core 402-1 and/or the first task 404-1, through an Nth maximum allowed failure rate 430-N to be used for the Nth core 402-N and/or the Nth task 404-N. In some embodiments, the configuration register(s) are also optionally operable to store a global failure rate 432 and/or one or more derating factors 434. In some embodiments, a device or logic 436, such as, for example, a component of the processor, an operating system, a compiler, a user input/output device, or the like, may specify or otherwise configure the configuration registers 428. For example, the different failure rates, the global failure rates, and one or more derating factors may be specified and stored in the configuration registers.

The failure rate based minimum voltage limiting logic also includes a minimum operational voltage determination logic 438 coupled with the configuration registers 428. The minimum operational voltage determination logic is operable to determine different minimum operational voltages for different corresponding failure rates specified in the configuration registers. This may be done substantially as described elsewhere herein. In some embodiments, this may involve using failure rate-voltage relation logic 444 (e.g., to evaluate a relationship similar to that shown in FIG. 2) and optionally derating factors logic 446 to evaluate the one or more derating factors 434. Minimum voltage limiting logic 440 is coupled with the minimum operational voltage determination logic 438. The minimum voltage limiting logic is operable to configure a minimum voltage limit that power management logic (e.g., a voltage management unit) is to obey. For example, the minimum voltage limiting logic may specify a minimum operational voltage that the voltage management unit is not to go below when it performs its voltage management functions.

In some embodiments, the failure rate based minimum voltage limiting logic may optionally include global failure rate enforcement logic 442. The global failure rate enforcement logic may be operable to enforce the global failure rate 432. The global failure rate enforcement logic may be coupled with the minimum voltage limiting logic. In some embodiments, the global failure rate enforcement logic may cause the minimum voltage limiting logic to increase one or more minimum operational voltage limits in order to ensure that the global failure rate is not exceeded. Moreover, as will be explained further below, in some embodiments, the global failure rate enforcement logic may de-activate one or more logic (e.g., one or more cores) in order to ensure that the global failure rate is not exceeded and/or activate one or more logic (e.g., one or more cores) when there is surplus budget available within the global failure rate.

The failure rate based minimum voltage limiting logic may be implemented in hardware (e.g., integrated circuitry), firmware, software, or a combination thereof. In some embodiments, the failure rate based minimum voltage limiting logic may include at least some logic located on-die with the cores and may include at least some hardware (e.g., integrated circuitry). In some embodiments, at least some of the failure rate based minimum voltage limiting logic may be implemented in firmware and/or software (e.g., of an operating system).

In the above described embodiments, the different failure rates and different corresponding voltages have been described as corresponding to different cores. Alternatively, rather than cores, these different failure rates and voltages may correspond to different portions of cores, hardware threads, execution units, caches, other types of logic used to implement tasks, error correction code logic, graphics accelerators, network adapters, wireless management modules, memory controllers, storage devices, or the like, or various combinations thereof. In general, any logic in a separate voltage domain may potentially be given a different maximum allowed failure rate and a different corresponding minimum allowed voltage. In an event of multiple tasks with different desired failure rates in a same voltage domain, in some embodiments the highest demanded voltage may be set as the low limit in order to satisfy all desired reliability levels.

To avoid obscuring the description, a relatively simplified processor 400 has been shown and described. In other embodiments, the processor may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. There are literally numerous different combinations and configurations of components in processors, and embodiments are not limited to any particular combination or configuration. The processor may represent one or more monolithic integrated circuits or semiconductor die (e.g., a single die or a package incorporating two or more die). In some embodiments, the processor may represent a system-on-chip (SoC) having a plurality of cores as well as other components (e.g., an integrated memory controller, integrated graphics, an integrated input/output controller, two or more heterogeneous cores, or some combination thereof).

The embodiments of FIGS. 3-4 have determined different minimum operational voltages to impose to achieve different maximum failure rates. Other embodiments are not limited to using different minimum operational voltages to achieve different maximum failure rates. For example, other embodiments may be based on activating and deactivating logic that is not required (e.g., enabling or disabling error correction code (ECC) logic, a cache, or other logic which is helpful but not required), changing the way the logic operates in a way that affects the actual failure rates (e.g., changing the level or strength of the ECC logic, changing the number of entries in a cache, etc.), or otherwise changing the operational configuration of the processor in a way that affects the actual failure rate and may be used to provide different maximum failure rates.

Figure 5:
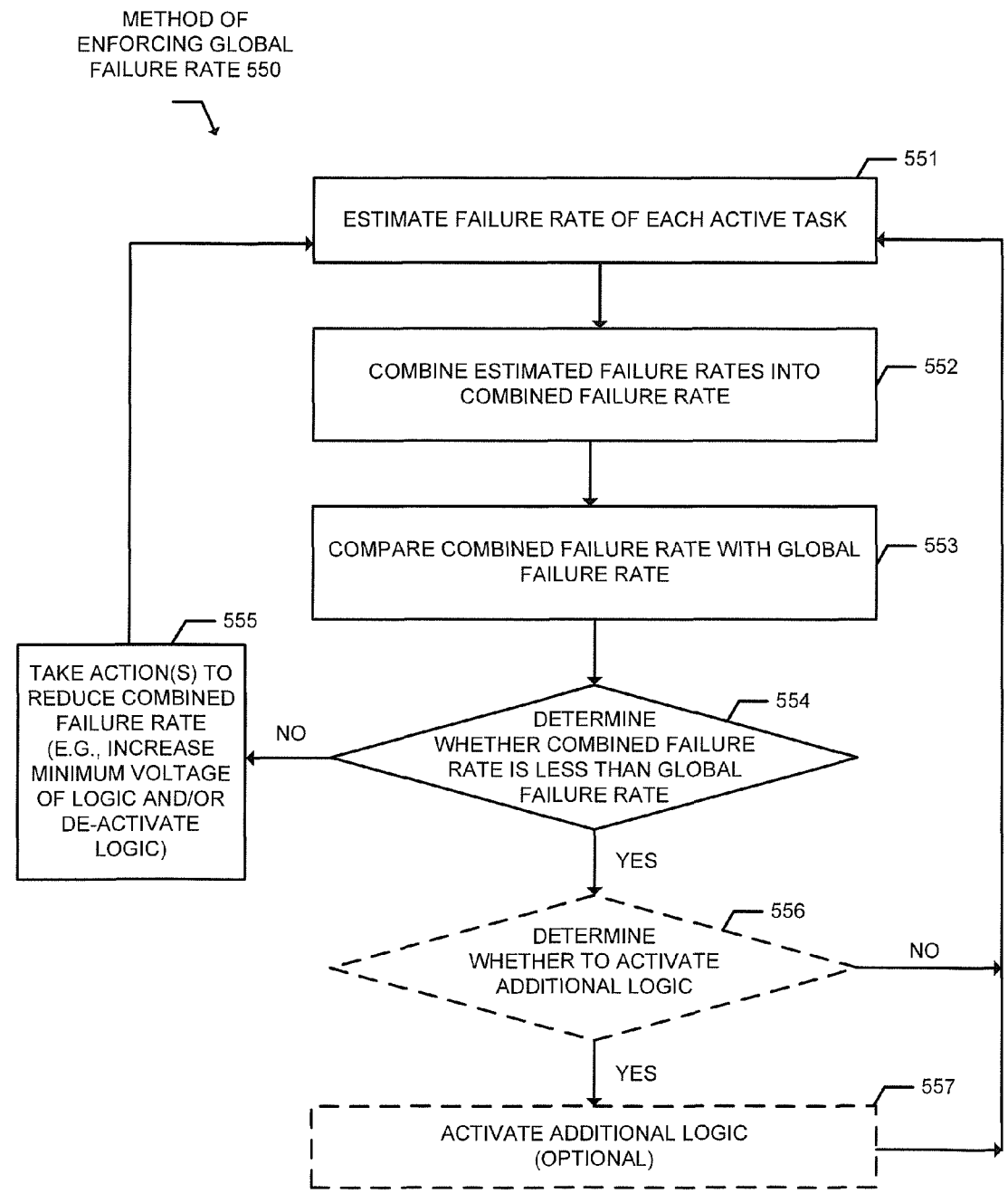
FIG. 5 is a block flow diagram of an embodiment of a method of enforcing a fixed global failure rate.

FIG. 5 is a block flow diagram of an embodiment of a method 550 of enforcing a fixed global failure rate. In some embodiments, the method may be performed in a processor or other integrated circuit. In some embodiments, the operations and/or method of FIG. 5 may be performed by and/or within the processor of FIG. 4. Alternatively, the operations and/or method of FIG. 5 may be performed by and/or within either a similar or an entirely different processor or other integrated circuit. Moreover, the processor of FIG. 4 may perform operations and/or methods either the same as, similar to, or entirely different than those of FIG. 5.

The method includes estimating a failure rate for each of a plurality of active tasks, at block 551. By way of example, this estimation may be based on the current operating voltage (which may be greater than the minimum allowed operating voltage) and optionally one or more derating factors. Then, the estimated failure rates of each of the active tasks may be added or otherwise combined into a combined failure rate, at block 552. Next, at block 553, the combined failure rate may be compared in magnitude with the fixed global failure rate. Recall that the fixed global failure rate may be based on a desired or design chip reliability level for the integrated circuit or chip.

At block 554, a determination may be made whether the combined failure rate is less than (or less than or equal to) the fixed global failure rate. If the combined failure rate is not less than the fixed global failure rate (i.e., "no" is the determination at block 554), the method may advance to block 555. At block 555, one or more actions may be taken to help reduce the combined failure rate. In some embodiments, this may include increasing at least one, a plurality, or all minimum operational voltage(s) for at least one, a plurality, or all corresponding tasks or logic used to implement those tasks. Increasing these minimum voltages reduces the failure rates. As another option, in some embodiments, this may include de-activating at least some logic and/or otherwise reconfiguring the logic in a way that reduces the actual failure rate. For example, a core executing a task with a highest failure rate, or relatively high failure rate, may be de-activated. Alternatively, other types of logic may be de-activated. For example, in one embodiment, error correction code (ECC) logic, a cache, or other logic which is helpful but not strictly required to implement a task, may be de-activated (e.g., by gating the logic). As another example, a level of ECC may be reduced in a way that reduces the actual failure rate. Alternatively, other logic in its own voltage domain and/or capable of being separately gated may optionally be de-activated. The method may return from block 555 to block 551.

Referring again to FIG. 5, if instead the determination is that the combined failure rate is less than the fixed global failure rate (i.e., "yes" is the determination at block 554), then the method may optionally advance to block 556. This means that there is remaining budget within the fixed global failure rate that is not currently being utilized. At block 556, a determination may be made whether additional logic should be activated. In various aspects, this may include determining whether an additional task is ready to execute, whether logic was previously de-activated in order to enforce the fixed global failure rate, etc. If the additional logic should not be activated (i.e., "no" is the determination at block 556), then the method may return to block 551. Alternatively, if the additional logic should be activated (i.e., "yes" is the determination at block 556), then the additional logic may be activated at block 557, and then the method may return to block 551. In some embodiments, the additional logic may be activated at minimum allowed operational voltages that are based on the fixed global failure rate (e.g., that ensure that the global failure rate is not surpassed). Alternatively, in another embodiment, if blocks 556 and 557 are optionally omitted, then the method may return to block 551 directly upon determining that the combined failure rate is less than the fixed global failure rate (i.e., a "yes" determination) at block 554.

In some embodiments, the ability to activate additional logic when there is currently remaining budget within the fixed global failure rate may help to avoid the fixed global failure rate limiting the number of cores or the amount of logic in a given integrated circuit design. Rather, additional cores and/or logic may be included and selectively activated when there is budget within the global failure rate, or selectively deactivated when there is not budget within the global failure rate. This may allow a greater number of cores to run, and increased performance to be achieved, when enough tasks run at low failure rates, or run at high voltages for other reasons. It may be used to provide a more sophisticated and less restrictive way of ensuring the fixed global failure rate that allows for improved performance when possible.

In some embodiments, the method 550 may be repeated during operation. For example, the method may be repeated based on task changes, based on task switching, after voltage scaling has been performed, periodically at set intervals, etc.

To avoid obscuring the description, the embodiments above have not been described in conjunction with other power management techniques, such as, for example, dynamic voltage scaling, dynamic voltage and frequency scaling, and the like. However, it is to be appreciated that embodiments may be used either without or with such other power management techniques.

Components, features, and specific optional details described for FIG. 2 may also optionally be used in any one or more of FIGS. 3, 4, and 5. Moreover, the components, features, and specific optional details described herein for an apparatus also optionally apply to the methods described herein which may in embodiments be performed by and/or with such an apparatus. Also, the apparatus may perform the operations and methods disclosed including according to their features and specific optional details.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-order and Out-of-order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-order Core Architecture

Figure 7B:
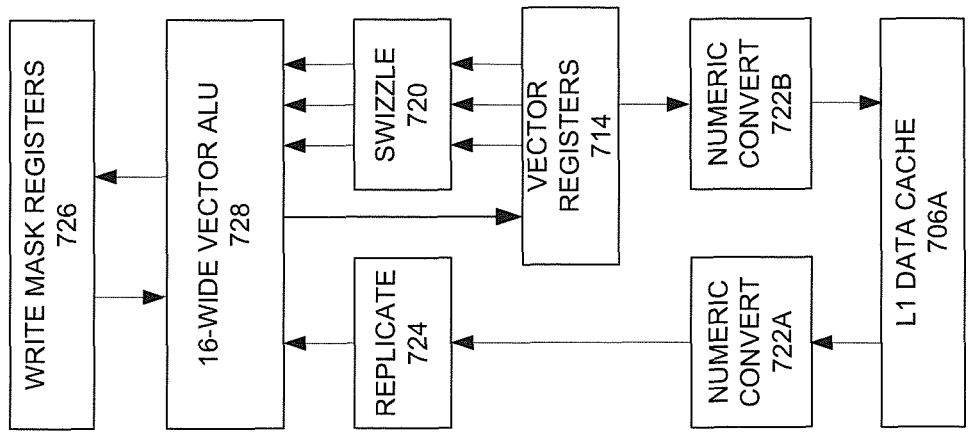
FIG. 7B is an expanded view of part of the processor core in FIG. 7A according to embodiments of the invention.
Figure 7A:
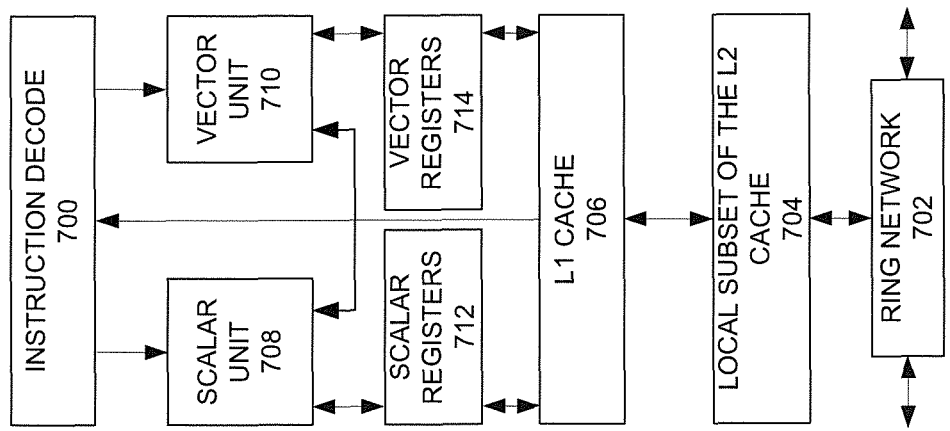
FIG. 7A is a block diagram of a single processor core, along with its connection to the on-die interconnect network and with its local subset of the Level 2 (L2) cache, according to embodiments of the invention.

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Processor with Integrated Memory Controller and Graphics

Figure 8:
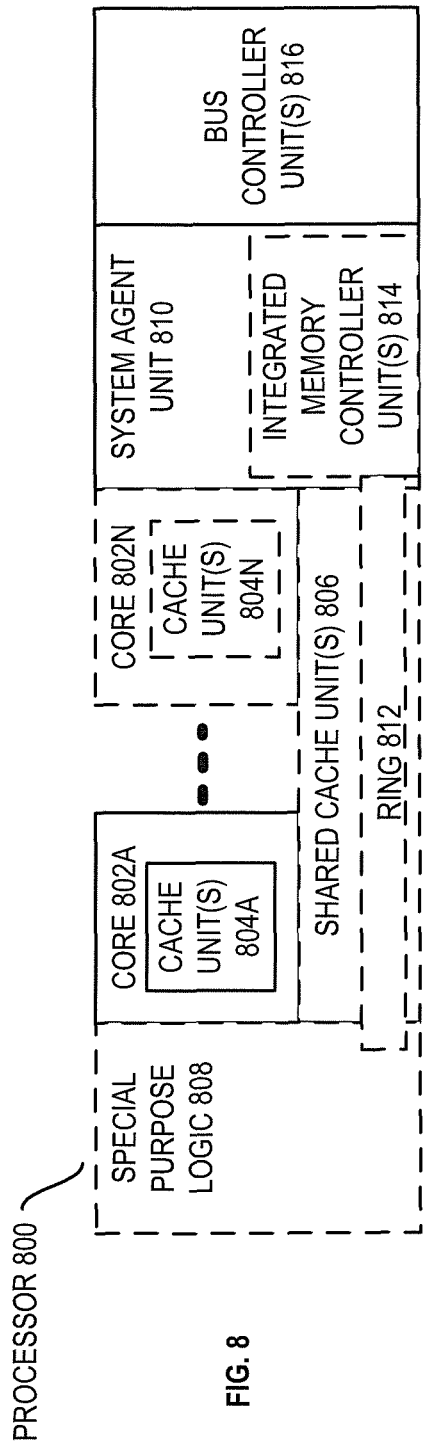
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
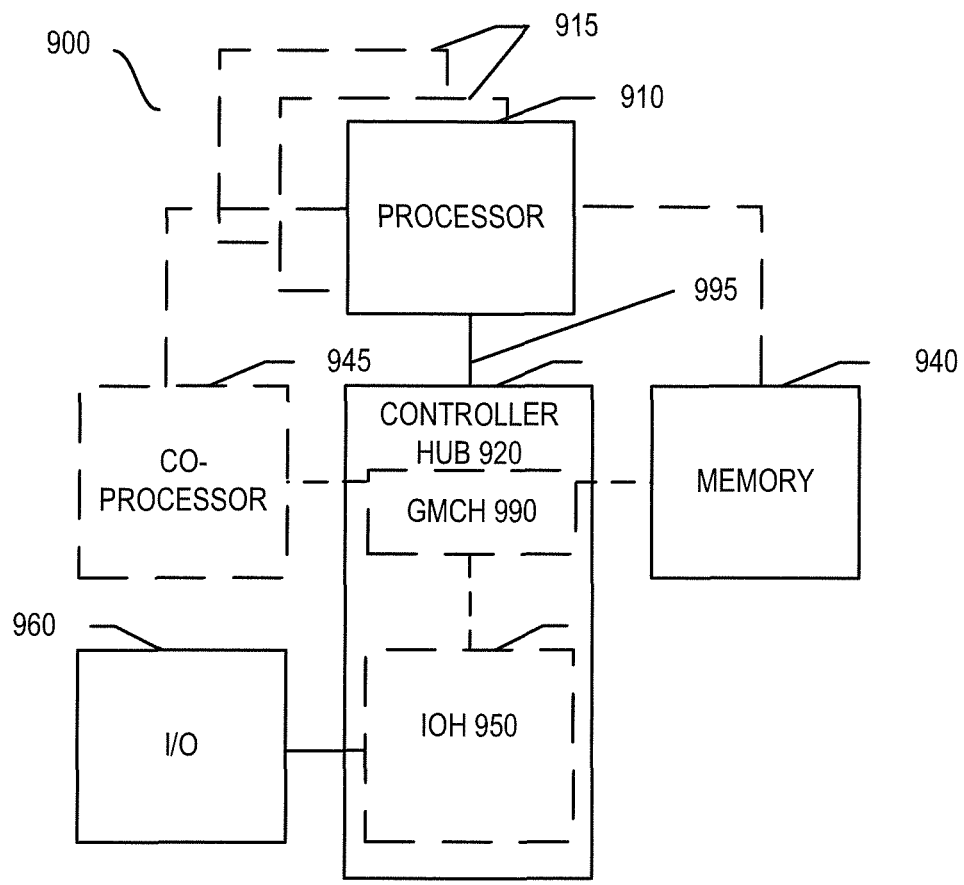
FIG. 9, shown is a block diagram of a system in accordance with one embodiment of the present invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
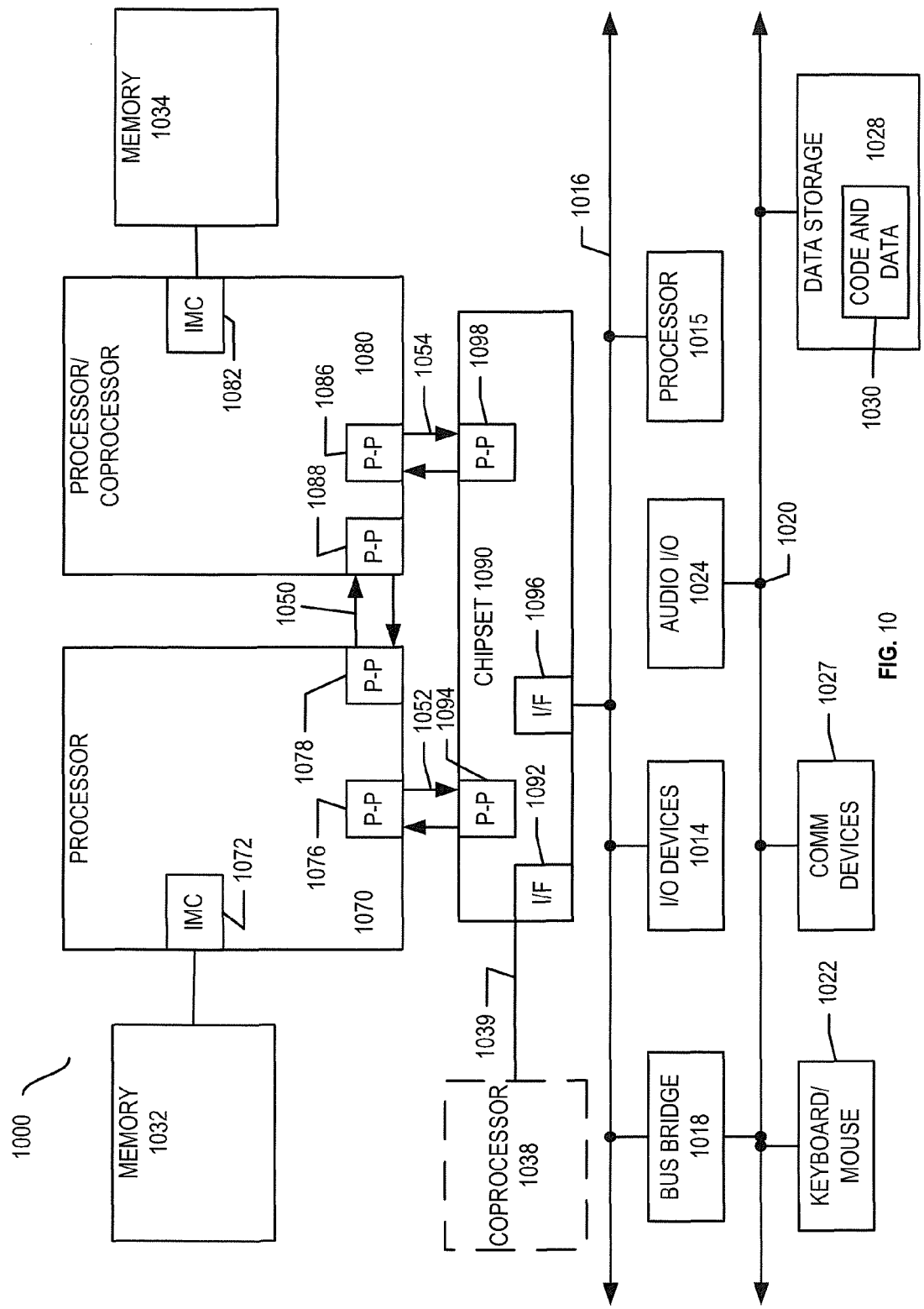
FIG. 10, shown is a block diagram of a first more specific exemplary system in accordance with an embodiment of the present invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
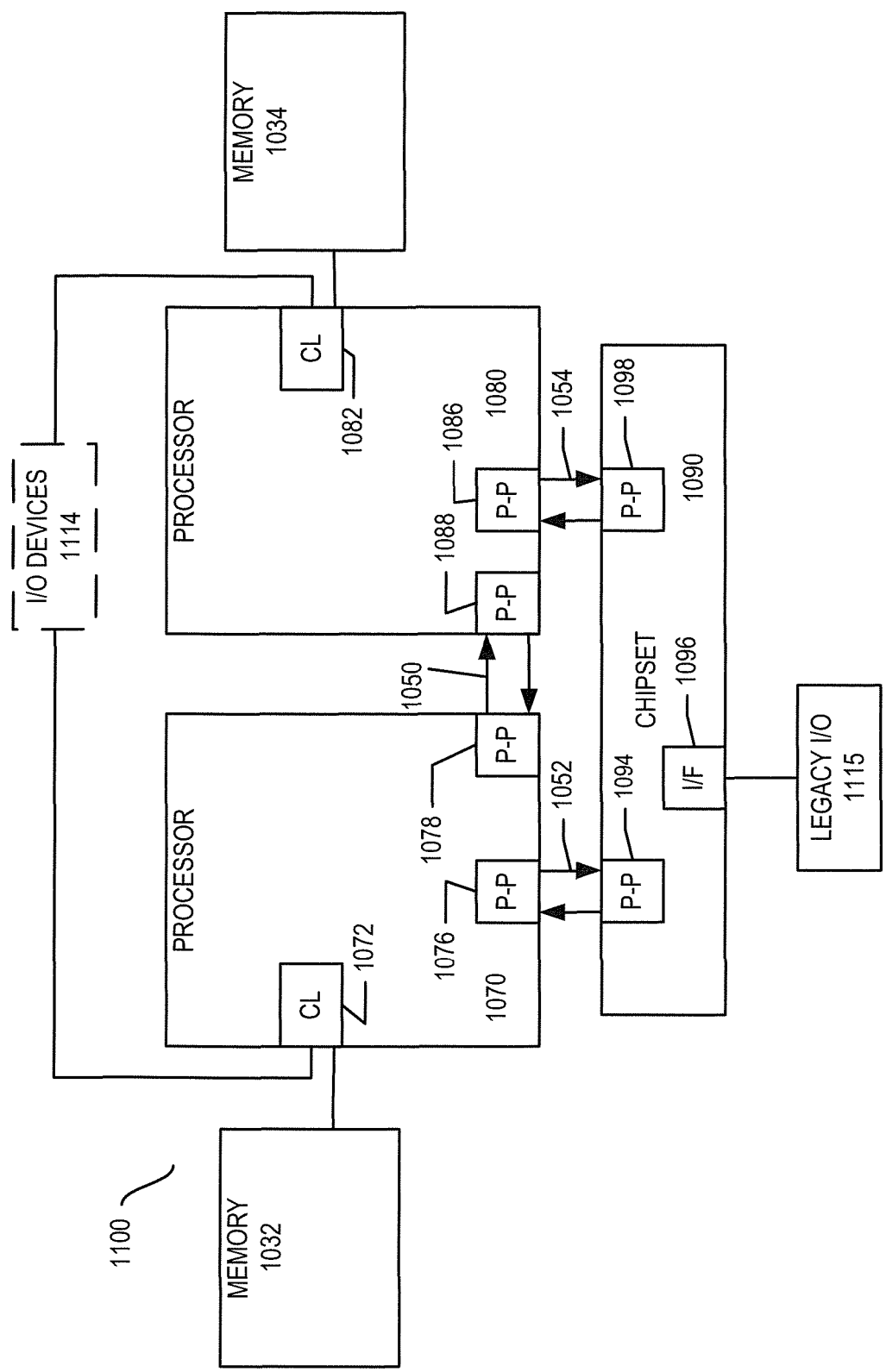
FIG. 11, shown is a block diagram of a second more specific exemplary system in accordance with an embodiment of the present invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
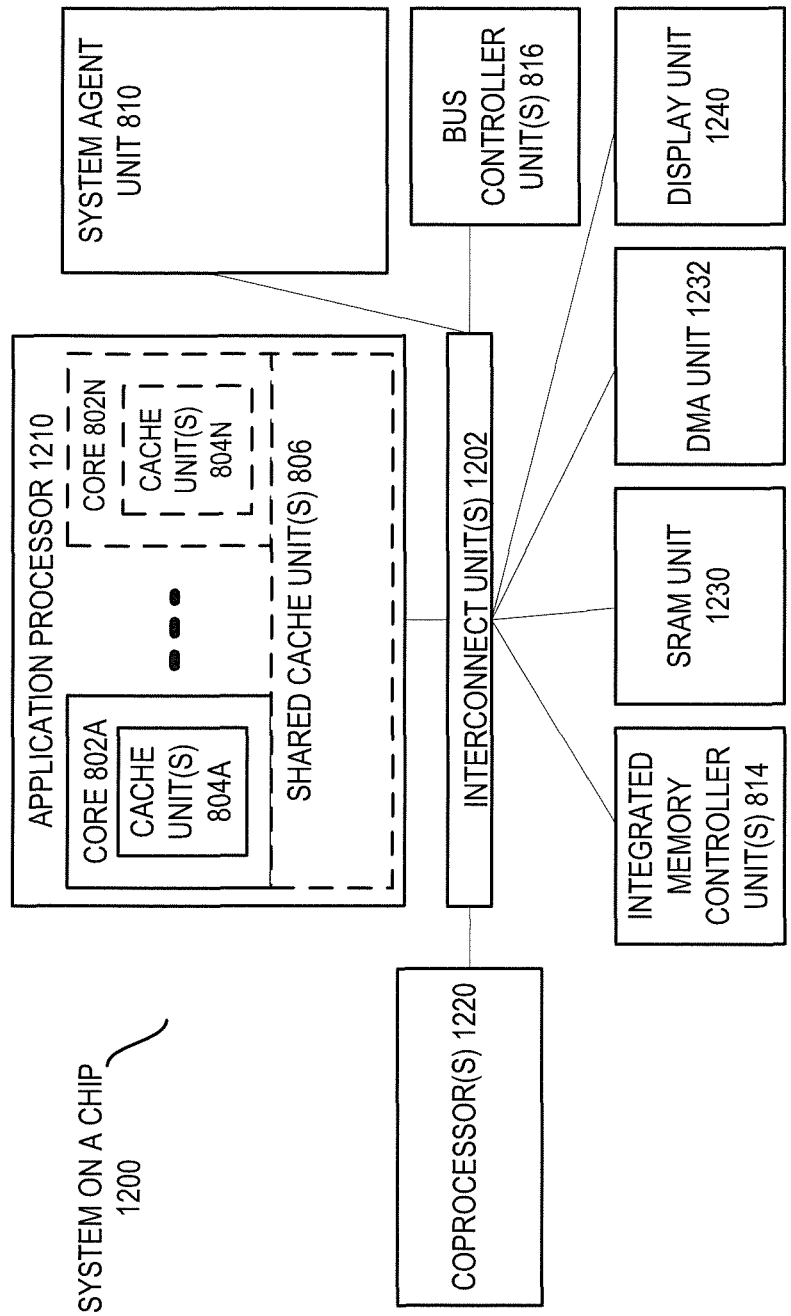
FIG. 12, shown is a block diagram of a SoC in accordance with an embodiment of the present invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
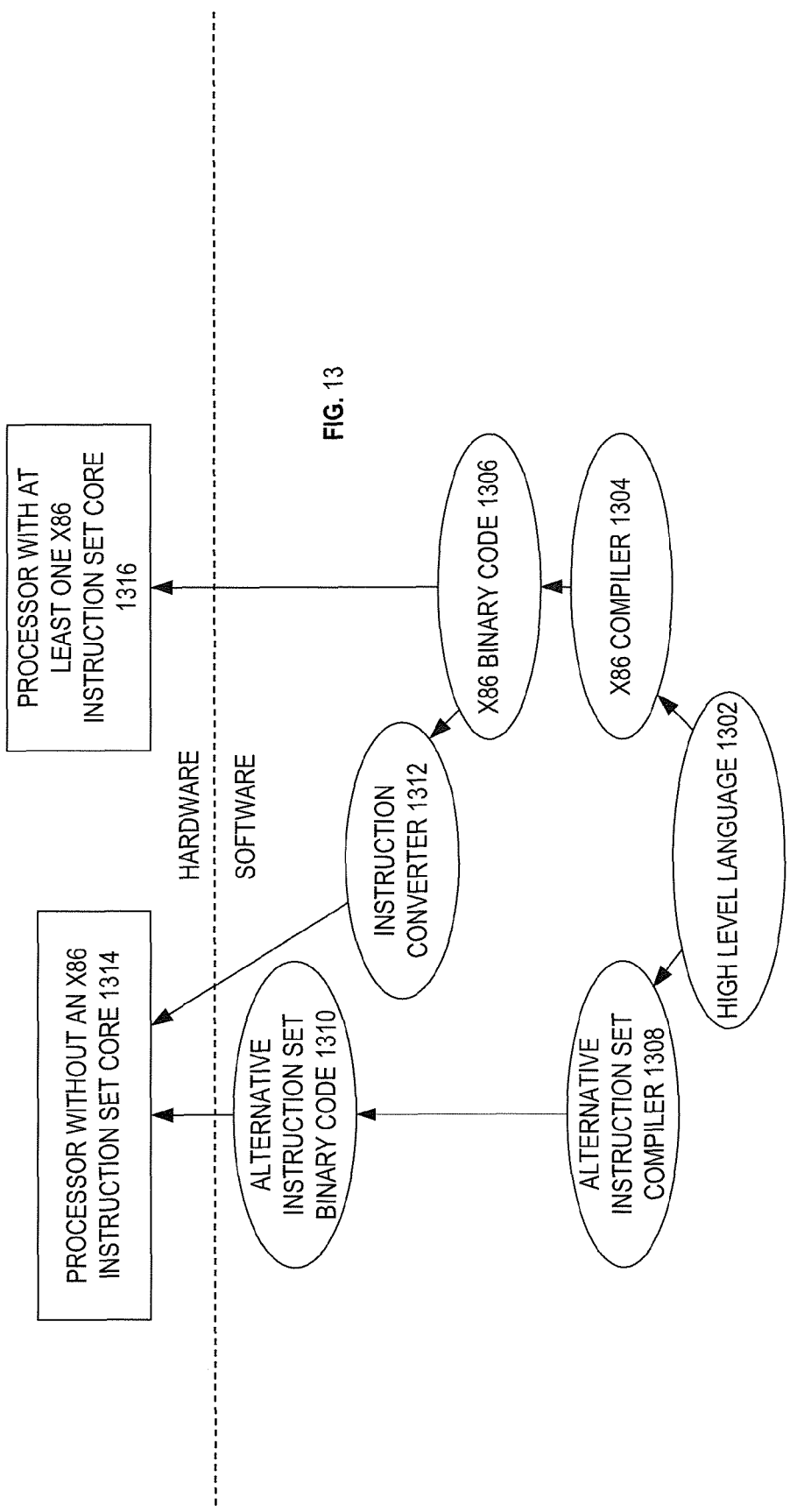
FIG. 13 is a block diagram contrasting the use of a software instruction converter to convert binary instructions in a source instruction set to binary instructions in a target instruction set according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

In the description and claims, the term "logic" may have been used. As used herein, the term logic may include but is not limited to hardware, firmware, software, or a combination thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other (e.g., through one or more intervening components).

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

Where considered appropriate, reference numerals have been repeated among the figures to indicate components that may optionally be substantially the same and have similar characteristics. In other instances, terminal portions of reference numerals have been repeated among the figures to indicate corresponding or analogous elements, which may optionally have similar or the same characteristics unless specified or clearly apparent otherwise. In some cases, where multiple components have been shown and described, they may be incorporated into a single component. In other cases, where a single component has been shown and described, it may be separated into two or more components. In the drawings, arrows represent couplings and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more, or a sequence of instructions, that if executed by a machine causes the machine to perform and/or results in the machine performing one or operations, methods, or techniques disclosed herein. In some embodiments, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or the like. The tangible medium may include one or more solid or tangible physical materials, such as, for example, a semiconductor material, a phase change material, a magnetic material, etc. In another embodiment, the machine-readable media may include a non-tangible transitory machine-readable communication medium, for example, the electrical, optical, acoustical or other forms of propagated signals, such as carrier waves, infrared signals, digital signals, etc.

Examples of suitable machines include, but are not limited to, computer systems, desktops, laptops, notebooks, netbooks, nettops, Mobile Internet devices (MIDs), servers, network elements (e.g., routers, switches, etc.) cellular phones, media players, nettops, set-top boxes, video game controllers, and other electronic devices having one or more processors or other instruction execution apparatus. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more busses and bridges (also termed bus controllers). Thus, the storage device of a given electronic device may store code and/or data for execution on the one or more processors of that electronic device. Alternatively, one or more parts of an embodiment of the invention may be implemented using different combinations of software, firmware, and/or hardware.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
   specifying a plurality of different maximum failure rates each corresponding to a different task of a plurality of tasks executing at a given time on a processor;
   determining a different operational configuration each including a different minimum voltage for each of the plurality of specified different maximum failure rates;
   enforcing a plurality of processor logic each executing a different one of the plurality of tasks to operate at a given time on the processor according to the different corresponding determined operational configurations including enforcing the plurality of processor logic to operate at voltages not less than the different corresponding determined minimum voltages.

2. The method of claim 1, wherein determining comprises determining the minimum operational voltages based on at least one derating factor selected from temperature, altitude, Architectural Vulnerability Factor (AVF), a timing derating factor, a logic derating factor, and combinations thereof.

3. The method of claim 1, wherein determining comprises:
   determining a higher minimum operational voltage for a lower maximum failure rate assigned to a first task having supervisory control over a second task; and
   determining a lower minimum operational voltage for a higher maximum failure rate assigned to the second task.

4. The method of claim 3, wherein the first task comprises an operating system task and the second task comprises a non-operating system task.

5. The method of claim 3, wherein the first task comprises a main thread and the second task comprises a sub-thread of the main thread.

6. The method of claim 3, wherein the first task comprises a time-critical task and the second task comprises a non-time critical task.

7. The method of claim 1, wherein determining comprises determining different configurations of error correction code for the different maximum failure rates, and
   wherein enforcing comprises enforcing the processor logic to operate with the different configurations of the error correction code.

8. The method of claim 1, further comprising enforcing a predetermined global failure rate including:
   estimating a failure rate for each of the tasks;
   combining the estimated failure rates into a combined failure rate;
   comparing the combined failure rate with the predetermined global failure rate for the processor;
   determining that the combined failure rate is not less than the global failure rate; and
   taking at least one action to reduce the combined failure rate.

9. The method of claim 8, wherein taking the at least one action comprises de-activating at least one of the processor logic.

10. The method of claim 8, wherein taking the at least one action comprises increasing at least one minimum operational voltage for at least one corresponding task.

11. The method of claim 1, wherein determining comprises determining at least three different minimum operational voltages each for one of at least three different maximum failure rates.

12. The method of claim 1, wherein enforcing comprises enforcing at least ten cores, each executing a different task of at least ten tasks, to operate at or above a corresponding determined minimum operational voltage.

13. A processor comprising:
a plurality of logical processors to each execute a different corresponding task of a plurality of tasks;
logic to determine a different operational configuration including a different minimum voltage for each of a plurality of specified different maximum failure rates, each of the specified different maximum failure rates to correspond to a different task of the plurality of tasks that are to execute at a given time on the processor; and
logic to enforce the plurality of logical processors to operate at a given time on the processor according to the different corresponding determined operational configurations including at voltages not less than the different corresponding minimum voltages when executing the corresponding tasks.

14. The processor of claim 13, wherein the logic to determine the minimum operational voltages comprises logic to determine the minimum operational voltages based on at least one derating factor selected from temperature, altitude, Architectural Vulnerability Factor (AVF), a timing derating factor, a logic derating factor, and combinations thereof.

15. The processor of claim 13, wherein the logic to determine the different operational configurations comprises logic to determine a higher minimum operational voltage for a lower maximum failure rate corresponding to a first task having supervisory control over a second task and determine a lower minimum operational voltage for a higher maximum failure rate corresponding to the second task.

16. The processor of claim 15, wherein the first task comprises an operating system task and the second task comprises a non-operating system task.

17. The processor of claim 15, wherein the first task comprises a main thread and the second task comprises a sub-thread of the main thread.

18. The processor of claim 15, wherein the first task comprises a time-critical task and the second task comprises a non-time critical task.

19. The processor of claim 13, wherein the logic to determine the different operational configurations comprises logic to determine different configurations of error correction code for the different maximum failure rates.

20. The processor of claim 13, further comprising global failure rate enforcement logic to:
estimate a failure rate for each of the tasks;
combine the estimated failure rates into a combined failure rate;
compare the combined failure rate with a global failure rate for the processor;
determine that the combined failure rate is not less than the global failure rate; and
take at least one action to reduce the combined failure rate.

21. A system comprising:
an interconnect;
a processor coupled with the interconnect, the processor including:
a plurality of logical processors to each execute a different corresponding task of a plurality of tasks;
logic to determine a different operational configuration including a different minimum voltage for each of a plurality of specified different maximum failure rates for a processor, each of the specified different maximum failure rates to correspond to a different task of the plurality of tasks that are to execute at a given time on the processor; and
logic to enforce the plurality of logical processors to operate at a given time on the processor according to the different corresponding determined operational configurations including at voltages not less than the different corresponding minimum voltages when executing the corresponding tasks; and
a dynamic random access memory (DRAM) coupled with the interconnect.

22. The system of claim 21, wherein the logic to determine the different minimum operational configurations is to determine based on at least one derating factor selected from temperature, altitude, Architectural Vulnerability Factor (AVF), a timing derating factor, a logic derating factor, and combinations thereof.

23. The system of claim 21, wherein the logic to determine the different operational configurations comprises logic to determine different configurations of logic that affect failure rates.

* * * * *